(12) United States Patent
Wang

(10) Patent No.: US 8,632,060 B2
(45) Date of Patent: Jan. 21, 2014

(54) BUMPER FOR MANIPULATOR

(75) Inventor: Jin-Xin Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 1314 days.

(21) Appl. No.: 12/391,413

(22) Filed: Feb. 24, 2009

(65) Prior Publication Data

US 2010/0127439 A1    May 27, 2010

(30) Foreign Application Priority Data

Nov. 27, 2008   (CN) .......................... 2008 1 0305803

(51) Int. Cl.
*B60G 1/00* (2006.01)
*G05G 1/00* (2008.04)

(52) U.S. Cl.
USPC ................. 267/66; 267/150; 74/469; 74/470

(58) Field of Classification Search
USPC ............... 267/66, 150; 74/469, 470, 471 XY, 74/473.1, 473.27, 473.28, 473.3
See application file for complete search history.

(56) References Cited

U.S. PATENT DOCUMENTS

| | | | | |
|---|---|---|---|---|
| 1,458,331 A * | 6/1923 | Garman | ......................... | 403/56 |
| 2,615,439 A * | 10/1952 | Humphreys | ............... | 123/90.53 |
| 3,062,346 A * | 11/1962 | Sharpe | ......................... | 192/48.5 |
| 3,237,977 A * | 3/1966 | Batchelder | ..................... | 403/331 |
| 4,371,063 A * | 2/1983 | Troemner et al. | .......... | 192/219.6 |
| 4,375,631 A * | 3/1983 | Goldberg | ....................... | 338/128 |
| 4,733,214 A * | 3/1988 | Andresen | ...................... | 338/128 |
| 5,286,024 A * | 2/1994 | Winblad | .................... | 273/148 B |
| 6,957,807 B2 * | 10/2005 | Zimmer et al. | ............ | 267/64.11 |
| 7,019,732 B2 * | 3/2006 | Furukawa | ..................... | 345/161 |

FOREIGN PATENT DOCUMENTS

| | | |
|---|---|---|
| CN | 200975209 Y | 11/2007 |
| DE | 1500161 B * | 6/1969 |
| TW | M271113 | 7/2005 |
| TW | I281573 | 5/2007 |
| TW | 200839118 | 10/2008 |
| WO | WO2008/001951 A1 | 1/2008 |

\* cited by examiner

*Primary Examiner* — Pam Rodriguez
*Assistant Examiner* — Mahbubur Rashid
(74) *Attorney, Agent, or Firm* — Altis Law Group, Inc.

(57) ABSTRACT

A bumper includes a supporting member, a base, a flange, a connecting arm, and a resetting assembly. The base is fixedly connected to the supporting member. The connecting arm has a rotating portion rotatably positioned between the flange and the supporting member. The resetting assembly includes a resisting member and an elastic member. The resisting member is slidably connected to the supporting member. The elastic member is configured for producing an elastic force to drive the resisting member to resist the rotating portion of the connecting arm. One of the rotating portion and the resisting member defines a receiving groove, and the other one of the rotating portion and the resisting member defines a restricting protrusion rotatably engaging in the receiving groove.

13 Claims, 5 Drawing Sheets

BUMPER FOR MANIPULATOR

BACKGROUND

1. Field of the Disclosure

The present disclosure relates generally to bumpers and, more particularly, to a multi-directional bumper for a manipulator.

2. Discussion of the Related Art

A manipulator is widely used in the manufacturing industry to achieve high machining efficiency. The manipulator is generally assembled to a machine tool. However, the manipulator may collide with other components of the machine tool, such as a worktable in a machining process, potentially damaging the manipulator.

A pressure sensor is assembled to the manipulator to avoid the collision of the manipulator and the worktable. When the manipulator touches the worktable, the pressure sensor produces a warning signal, and transfers the warning signal to a controller. The controller controls the manipulator to move away from the worktable, and continues the machining process.

However, the manipulator needs both the pressure sensor and the controller to prevent the manipulator from colliding with the worktable. Therefore, a manufacturing cost for the manipulator is high.

Therefore, a bumper which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
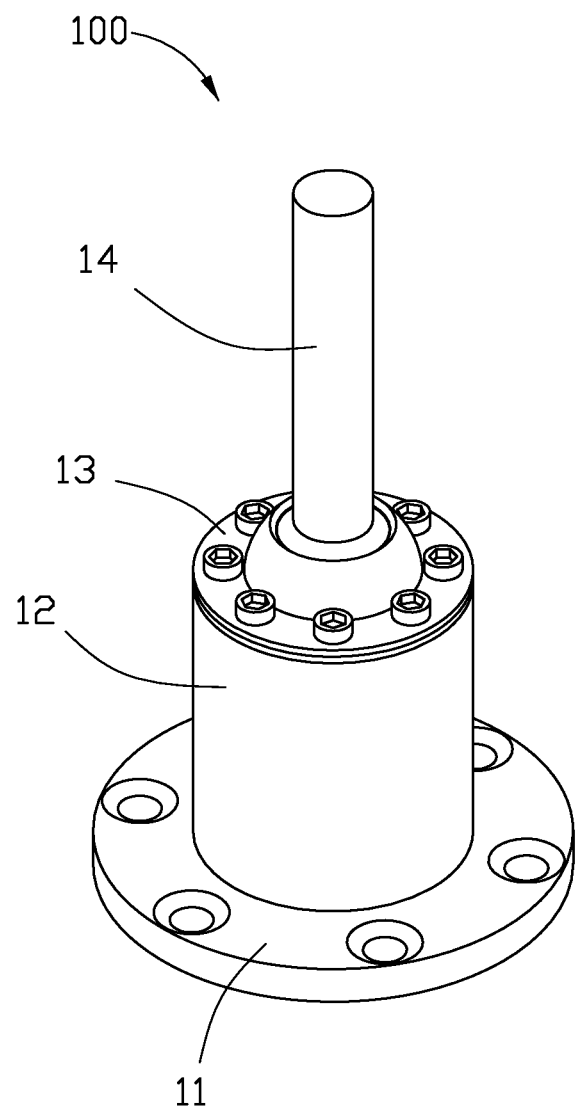
FIG. 1 is an assembled, isometric view of an embodiment of a bumper, the bumper including a base, a supporting member, a flange, a connecting arm, and a resetting assembly.
Figure 2:
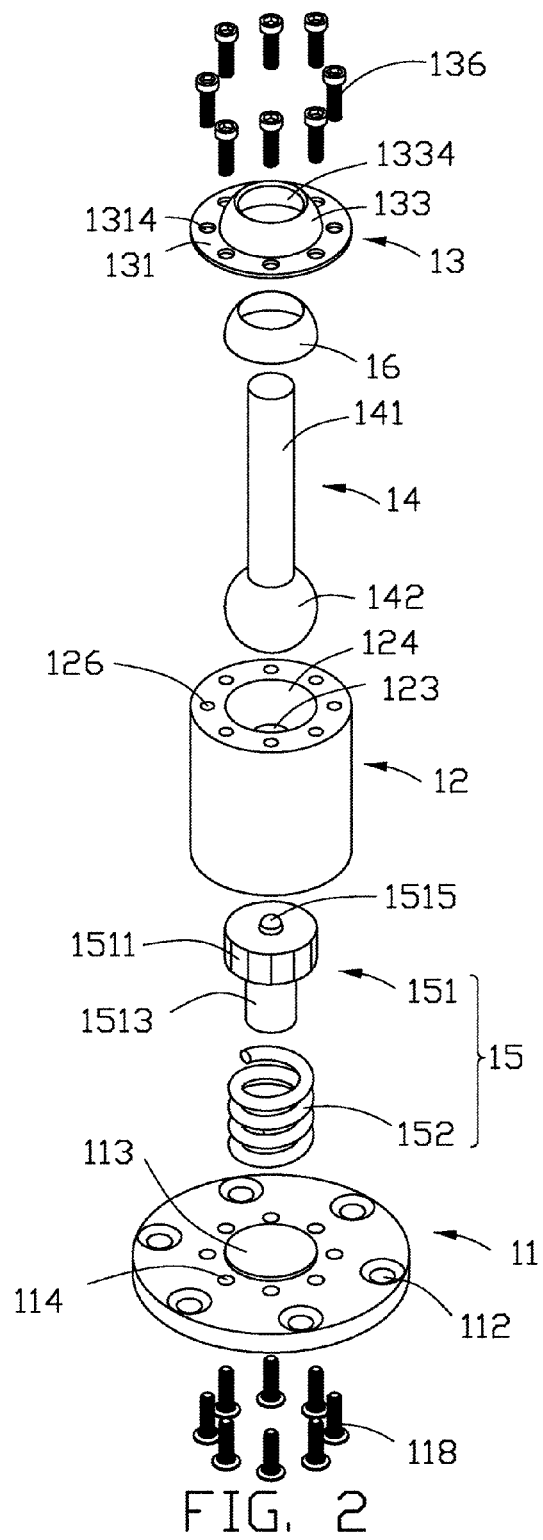
FIG. 2 is an exploded, isometric view of the bumper of FIG. 1.

Referring to FIGS. 1 and 2, an embodiment of a damper 100 includes a base 11, a supporting member 12, a flange 13, a connecting arm 14, a resetting assembly 15, a plurality of first fastening members 118, and a plurality of second fastening members 136.

Figure 3:
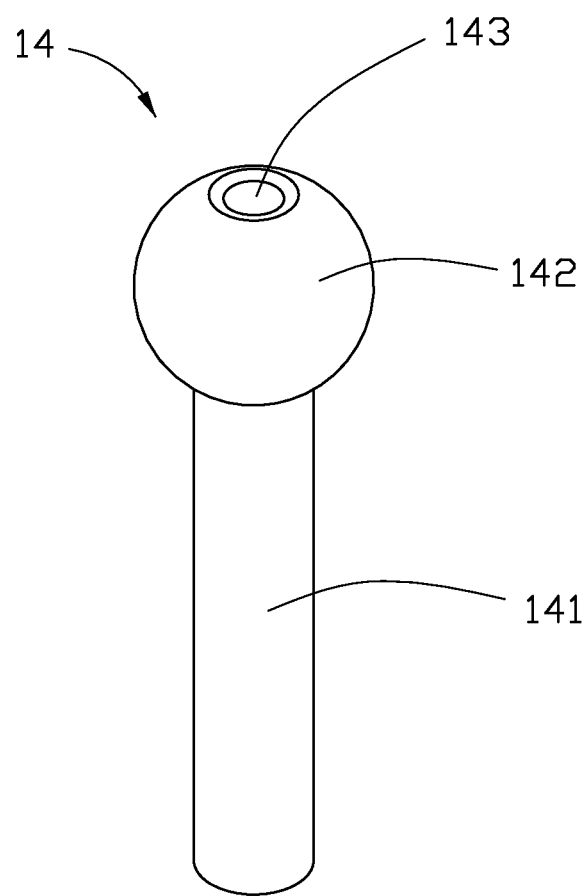
FIG. 3 is an isometric view of the connecting arm of FIG. 1.
Figure 4:
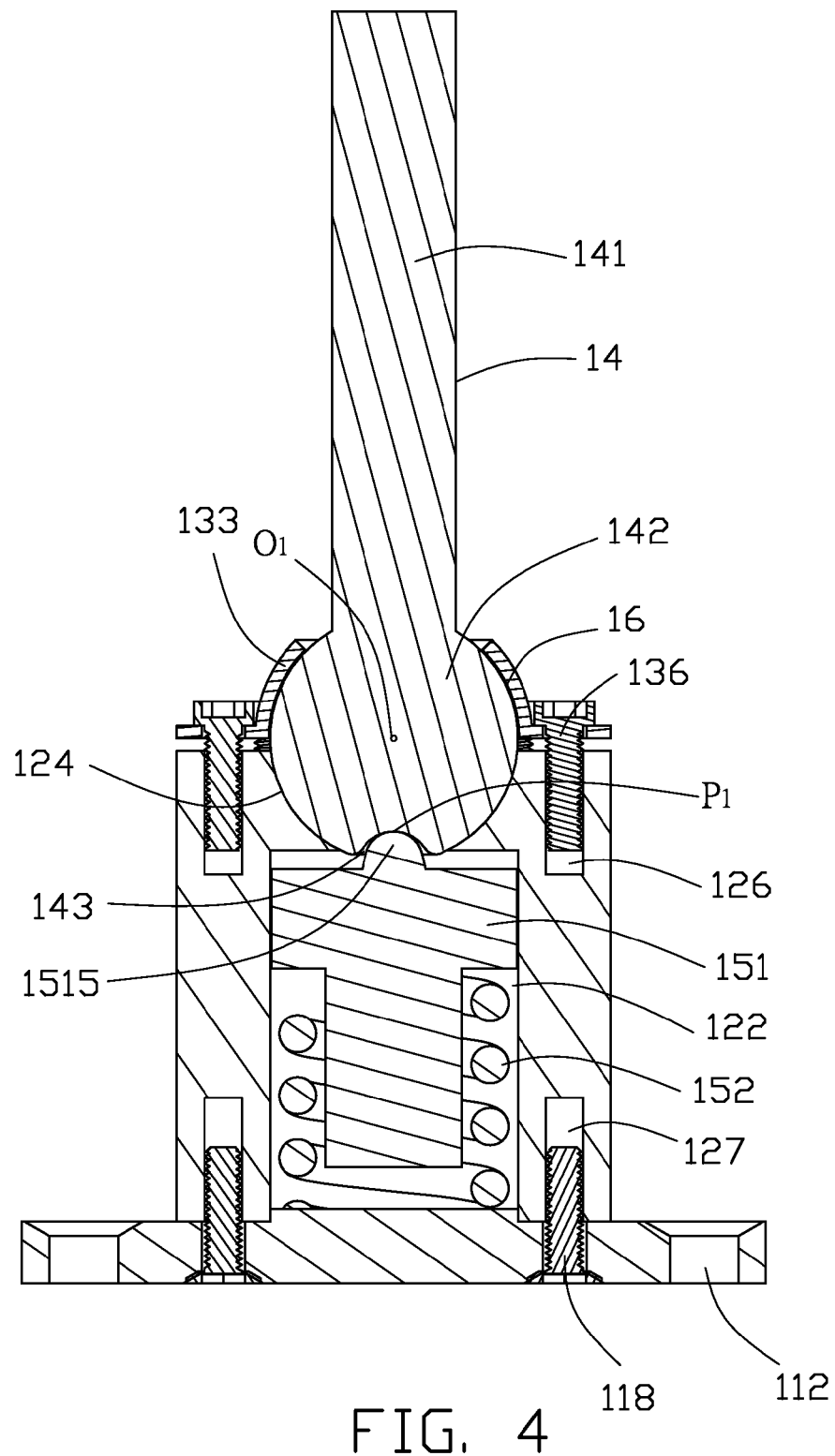
FIG. 4 is a cross-sectional view of the bumper of FIG. 1.

Referring also to FIGS. 3 and 4, the base 11 defines a plurality of assembling holes 112 in a periphery of the base 11, configured for connecting to a moving shaft of a machining tool (not shown). A positioning portion 113 is formed on a middle part of the base 11. The base 11 also defines a plurality of connecting holes 114 around the positioning portion 113. In the illustrated embodiment, the base 11 is cylindrical shaped.

The supporting member 12 defines a receiving hole 122 in a first end, and an assembling portion 124 in a second end opposite to the first end. The supporting member 12 also defines a through hole 123 communicating the receiving hole 122 with the assembling portion 124. The first end of the supporting member 12 further defines a plurality of threaded holes 127 around the receiving hole 122. The second end of the supporting member 12 further defines a plurality of threaded holes 126 around the assembling portion 124. In the illustrated embodiment, the supporting member 12 is substantially cylindrical shaped, and the assembling portion 124 is substantially semi-spherical shaped.

The connecting arm 14 includes a rod 141 and a rotating portion 142 formed on an end of the rod 141. In the illustrated embodiment, the rotating portion 142 is substantially spherical shaped. A center $O_1$ of the rotating portion 142 is aligned with an axis of the rod 141. The rotating portion 142 defines a substantially semi-spherical receiving groove 143 away from the rod 141. An end of the rod 141 opposite to the rotating portion 142 is configured to connect to a claw for clutching a workpiece (not shown).

The flange 13 includes a connecting portion 131 and a restricting portion 133 formed in a middle part of the connecting portion 131. The flange 13 defines a plurality of connecting holes 1314 in the connecting portion 131. The restricting portion 133 defines a circular hole 1334 in a top. The restricting portion 133 supports the rotating portion 142 of the connecting arm 14 and allows the rotating portion 142 to rotate freely. The rod 141 extends through the circular hole 1334 of the restricting portion 13.

The resetting assembly 15 includes a resisting member 151 and an elastic member 152. The resisting member 151 includes a sliding portion 1511. A supporting pole 1513 extends from a bottom surface of the sliding portion 1511. A restricting protrusion 1515 extends from a top surface of the sliding portion 1511. In the illustrated embodiment, the sliding portion 1511 is substantially cylindrical shaped, and the restricting protrusion 1515 is substantially semi-spherical shaped. The sliding portion 1511 is slidably received in the receiving hole 122 of the supporting member 12. The restricting protrusion 1515 is rotatably received in the receiving groove 143 of the connecting arm 14. The elastic member 152 is sleeved on the supporting pole 1513. In the illustrated embodiment, the elastic member 152 is a compression spring.

In the illustrated embodiment, both the first fastening members 118 and the second fastening members 136 are screws.

In assembling the bumper 100, the resisting member 151 is inserted into the receiving hole 122 of the supporting member 12. The elastic member 152 sleeves on the supporting pole 1513 of the resisting member 151. The base 11 is fixed to the first end of the supporting member 12 via the first fastening members 118. The positioning portion 113 engages in the receiving hole 122 of the supporting member 12. The elastic member 152 is resisted between the resisting member 151 and the supporting member 12. The restricting protrusion 1515 extends in the through hole 123 of the supporting member 12, and is partially received in the assembling portion 124. The rotating portion 142 of the connecting arm 14 is positioned in the assembling portion 124 of the supporting member 12, and the restricting protrusion 1515 is rotatably received in the receiving groove 143 of the connecting arm 14. The flange 13 is sleeved on the connecting arm 14, and is fixed to the second end of the supporting member 12 via the second fastening members 136. Therefore, the rotating portion 142 is rotatably positioned between the flange 13 and the supporting member 12. A rotating center of the connecting arm 14 is the center $O_1$ of the rotating portion 142.

In use, the claw for clutching the workpiece is assembled to the connecting arm 14. The base 11 is assembled to the moving shaft of the machine tool. FIG. 4 shows the bumper 100 in a normal mode. An axis of the resisting member 151 is aligned with the axis of the rod 141. A first contacting point $P_1$ of the resisting member 151 and the connecting arm 14 are aligned in the axis of the resisting member 151. Therefore, a direction of an elastic force produced by the elastic member 152 is along the axis of the rod 141. The connecting arm 14 should not vibrate during the machining process, because no rotating moment is produced.

Figure 5:
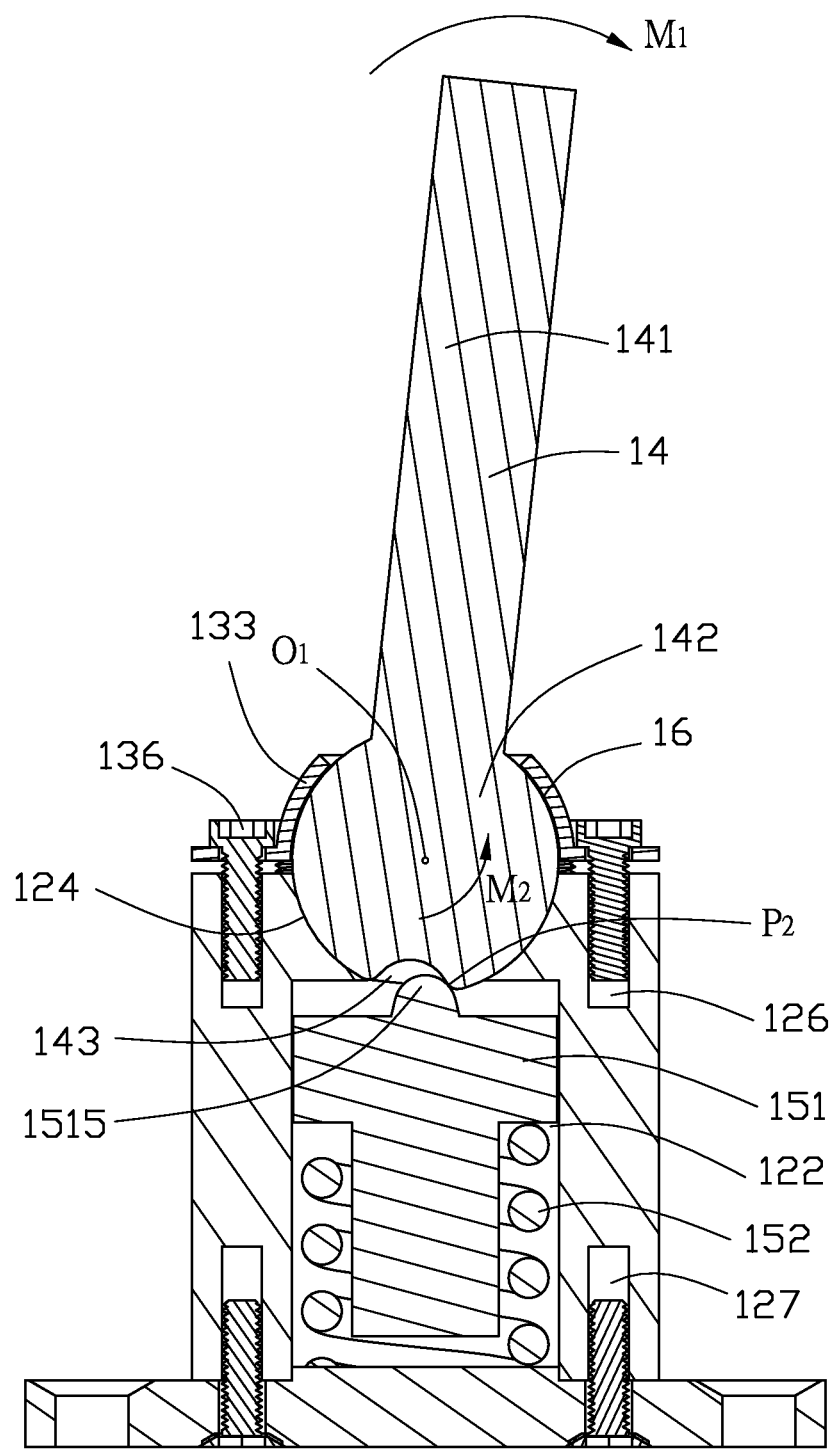
FIG. 5 is similar to FIG. 4, but the connecting arm rotating through an angle relative to the supporting member.

Referring to FIG. 5, when the rod 141 of the connecting arm 14 collides with other components of the machine tool, such as a worktable, a collision force is produced between the worktable and the connecting arm 14, and drives the connecting arm 14 to rotate around the center O1 of the rotating portion 142. Therefore, a rotating moment M1 is produce between the worktable and the connecting arm 14. A second contacting point P2 of the resisting member 151 and the connecting arm 14 deviates from the axis of the resisting member 151. The elastic member 152 compresses to absorb a collision force between the worktable and the connecting arm 14. Since the second contacting point $P_2$ deviates from the axis of the resisting member 151, a resetting moment $M_2$ is produced by a resisting force of the resisting member 151 and applied on the connecting arm 14. A direction of the resetting moment $M_2$ is opposite a direction of the rotating moment $M_1$. When the connecting arm 14 leaves the worktable, the rotating moment $M_1$ disappears. The connecting arm 14 rotates relative to the center O1 of the rotating portion 142 driven by the resetting moment M2. When the axis of the resisting member 151 is aligned with the axis of the rod 141, the resetting moment $M_2$ disappears and the connecting arm 14 stops rotating.

Since the elastic member 152 is compressed to absorb the collision force between the worktable and the connecting arm 14, the connecting arm 14 is not easily damaged by a collision between the connecting arm 14 and the worktable. In addition, when the connecting arm 14 leaves the worktable, the connecting arm 14 can automatically return to an original position by the resetting assembly 15.

It should be pointed out that a wear washer 16 can be positioned between the flange 13 and the rotating portion 142. Therefore, wear and tear on the flange 13 and the rotating portion 142 can be limited. The wear washer 16 can be made of polyformaldehyde (POM) by injection molding. In addition, the rotating portion 142 may form a restricting protrusion replacing the receiving groove 143, and the resisting member 151 would define a receiving groove replacing the restricting protrusion 1515. The rotating portion 142 can be other shapes, such as a column. In that case, both the assembling portion 124 of the supporting member 12 and the flange 13 are semi-column shaped. The connecting arm 14 can only rotate relative to a central axis of the rotating portion 142.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A bumper, comprising:
   a supporting member;
   a base fixedly connected to the supporting member;
   a connecting arm having a rotating portion rotatably positioned in the supporting member;
   a resetting assembly, comprising:
      a resisting member slidably connected to the supporting member;
      an elastic member configured for producing an elastic force to drive the resisting member to resist the rotating portion of the connecting arm;
   a flange comprising a connecting portion and a restricting portion formed in the connecting portion; and
   a wear washer positioned between the flange and the rotating portion,
      wherein the connecting portion and the base are fixedly connected to opposite ends of the supporting member, the rotating portion is substantially spherical shaped, the restricting portion sleeves on the rotating portion, an inner surface of the restricting portion is a substantially semi-spherical surface shaped corresponding to the rotating portion to engage with the rotating portion, one of the rotating portion and the resisting member defines a receiving groove, the other one of the rotating portion and the resisting member defines a restricting protrusion rotatably engaging in the receiving groove.

2. The bumper of claim 1, wherein the resisting member is slidably received in the supporting member, the elastic member is positioned between the resisting member and the base.

3. The bumper of claim 2, wherein the supporting member defines an assembling portion in a first end thereof, the rotating portion is partially received in the assembling portion.

4. The bumper of claim 3, wherein the supporting member defines a receiving hole in a second end opposite to the first end, the resisting member and the elastic member are received in the receiving hole of the supporting member.

5. The bumper of claim 4, wherein the base comprises a positioning portion engaging in the receiving hole of the supporting member.

6. The bumper of claim 5, wherein the supporting member further defines a through hole communicating the receiving hole with the assembling portion.

7. The bumper of claim 6, wherein the resisting member defines a restricting protrusion, the restricting protrusion extends through the through hole and partially received in the assembling portion.

8. The bumper of claim 7, wherein the resisting member comprises a sliding portion slidably received in the receiving hole; a supporting pole extends from a side surface of the sliding portion; the elastic member is sleeved on the supporting pole.

9. The bumper of claim 1, wherein the receiving groove is a substantially semi-spherical groove, the restricting protrusion is substantially semi-spherical shaped corresponding to the substantially semi-spherical groove.

10. The bumper of claim 1, wherein the connecting arm further comprises a rod, the rod extends through the flange.

11. The bumper of claim 10, wherein a center of the rotating portion is aligned with an axis of the rod.

12. The bumper of claim 1, wherein the elastic member is a compression spring.

13. The bumper of claim 1, wherein the wear washer is made of polyformaldehyde.

* * * * *